(12) United States Patent
Yamaga et al.

(10) Patent No.: US 11,346,271 B2
(45) Date of Patent: May 31, 2022

(54) COOLING SYSTEM AND COOLING METHOD

(71) Applicant: Mazda Motor Corporation, Hiroshima (JP)

(72) Inventors: Yuma Yamaga, Aki-gun (JP); Yusuke Koike, Aki-gun (JP); Takafumi Tanehira, Aki-gun (JP); Kanichi Yamaguchi, Aki-gun (JP); Katsutoshi Taninaka, Aki-gun (JP); Yusuke Mikuni, Aki-gun (JP); Yusuke Marutani, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/160,727

(22) Filed: Jan. 28, 2021

(65) Prior Publication Data
US 2021/0254538 A1    Aug. 19, 2021

(30) Foreign Application Priority Data

Feb. 19, 2020  (JP) .............................. JP2020-026034

(51) Int. Cl.
*F01P 7/10*   (2006.01)
*F01P 3/20*   (2006.01)
(Continued)

(52) U.S. Cl.
CPC ................. *F01P 7/10* (2013.01); *F01P 5/10* (2013.01); *F01P 7/14* (2013.01); *F02F 1/16* (2013.01);
(Continued)

(58) Field of Classification Search
CPC ....... B60K 11/085; B60K 11/02; B60K 11/08; F01P 11/16; F01P 11/10; F01P 2031/00
See application file for complete search history.

(56) References Cited

U.S. PATENT DOCUMENTS

| | | | | |
|---|---|---|---|---|
| 5,609,125 | A * | 3/1997 | Ninomiya | ................. F01P 7/08 123/41.12 |
| 2008/0283215 | A1* | 11/2008 | Saida | ................. B60H 1/00828 165/43 |

(Continued)

FOREIGN PATENT DOCUMENTS

JP          2015223905 A       12/2015

*Primary Examiner* — Long T Tran
(74) *Attorney, Agent, or Firm* — Alleman Hall Creasman & Tuttle LLP

(57) ABSTRACT

A cooling system configured to cool an engine of a vehicle is provided, which includes a cooling water passage through which cooling water is supplied to a water jacket in the engine, and having an undercover cooling water passage provided in an undercover and where the cooling water is cooled by exchanging heat with air below the undercover, a radiator provided in the cooling water passage and configured to cool the cooling water by exchanging heat with air flowing into an engine bay from a grille, a flow rate adjuster, a grille shutter provided to the grille and configured to change an effective opening area of the grille, and a controller configured to determine abnormality of the grille shutter and control, when determined as abnormal, the flow rate adjuster to increase the flow rate of the cooling water supplied to the undercover cooling water passage.

6 Claims, 5 Drawing Sheets

(51) Int. Cl.
*F01P 11/10* (2006.01)
*B60K 11/02* (2006.01)
*F02F 1/16* (2006.01)
*F01P 7/14* (2006.01)
*F01P 5/10* (2006.01)
*G07C 5/08* (2006.01)

(52) U.S. Cl.
CPC ...... *G07C 5/0808* (2013.01); *F01P 2007/146* (2013.01); *F01P 2025/66* (2013.01)

(56) References Cited

U.S. PATENT DOCUMENTS

| | | | | |
|---|---|---|---|---|
| 2011/0061405 | A1* | 3/2011 | Watanabe | B60K 11/085 |
| | | | | 62/133 |
| 2013/0316634 | A1* | 11/2013 | Ajisaka | B60K 11/08 |
| | | | | 454/152 |
| 2014/0297081 | A1* | 10/2014 | Asami | B60L 3/0061 |
| | | | | 701/22 |
| 2015/0088364 | A1* | 3/2015 | Sakayori | F01P 11/16 |
| | | | | 701/29.7 |
| 2015/0191078 | A1* | 7/2015 | Miyaji | B60K 11/085 |
| | | | | 701/49 |
| 2015/0343894 | A1 | 12/2015 | Yoshioka | |
| 2017/0227421 | A1* | 8/2017 | Kuhara | G01M 99/00 |
| 2017/0321597 | A1* | 11/2017 | Michikawauchi | F01P 3/20 |
| 2018/0259240 | A1* | 9/2018 | Onishi | F25D 21/02 |
| 2019/0234291 | A1* | 8/2019 | Cunningham | F01P 5/12 |

* cited by examiner

COOLING SYSTEM AND COOLING METHOD

TECHNICAL FIELD

The present disclosure relates to a cooling system which cools an engine of a vehicle, and a method of cooling an engine of a vehicle.

BACKGROUND OF THE DISCLOSURE

Air flows into an engine bay from a grille of a vehicle as the vehicle travels. Although this air can be used to cool cooling water in a radiator, it acts as resistance in traveling of the vehicle and fuel efficiency degrades. For example, JP2015-223905A discloses a grille shutter provided to a grille of a vehicle. When a given condition is met, the grille shutter closes the grille to prevent air from flowing therein and reduce air resistance to the vehicle.

The grille shutter of JP2015-223905A may disturb the vehicle traveling when an abnormality occurs in the grille shutter. For example, in a case where the grille shutter is in an abnormal state and cannot open the grille, the cooling of the cooling water in the radiator becomes difficult and the engine may overheat.

SUMMARY OF THE DISCLOSURE

The present disclosure is made in view of the above situation, and one purpose thereof is to provide a cooling system and a cooling method, which prevents an engine from overheating when a grille shutter is in an abnormal state.

According to one aspect of the present disclosure, a cooling system configured to cool an engine of a vehicle is provided. The system includes a cooling water passage through which cooling water is supplied to a water jacket formed in the engine, and having an undercover cooling water passage provided in an undercover forming a bottom surface of the vehicle and where the cooling water is cooled by exchanging heat with air below the undercover, a radiator provided in the cooling water passage and configured to cool the cooling water by exchanging heat with air flowing into an engine bay from a grille that is an opening portion formed at a front end of the vehicle, a flow rate adjuster including a pump or valve, configured to adjust a flow rate of the cooling water supplied to the undercover cooling water passage, a grille shutter provided to the grille of the vehicle and configured to change an effective opening area of the grille, and a controller configured to determine an abnormality of the grille shutter and control the flow rate adjuster, the controller controlling, upon determining that the grille shutter has the abnormality, the flow rate adjuster to increase the flow rate of the cooling water supplied to the undercover cooling water passage compared to when determined that the grille shutter has no abnormality.

In order to cool the cooling water, the configuration described above includes the undercover cooling water passage and the radiator. The undercover cooling water passage is provided to the undercover of the vehicle, and cools the cooling water by exchanging heat between the cooling water and air below the undercover.

Moreover, when the grille shutter is determined as abnormal, the controller controls the flow rate adjuster to increase the flow rate of the cooling water supplied to the undercover cooling water passage compared to when the grille shutter is not determined as abnormal. Thus, even when an airflow into the engine bay from the grille becomes difficult due to the abnormality of the grille shutter and the cooling water cannot be efficiently cooled in the radiator, the cooling of the cooling water in the undercover cooling water passage is stimulated. As a result, overheating of the engine in the abnormal state of the grille shutter is prevented.

The cooling water passage may have a bypass passage connecting a branching portion disposed at a position upstream of the radiator and downstream of the undercover cooling water passage, to a merging portion disposed at a position downstream of the radiator and upstream of the engine. The flow rate adjuster may include the valve which is configured to adjust a flow rate of the cooling water supplied from the branching portion to the bypass passage. The controller may control, upon determining that the grille shutter has the abnormality, the valve to increase the flow rate of the cooling water supplied to the bypass passage from the branching portion compared to when determined that the grille shutter has no abnormality.

According to this configuration, when the airflow into the engine bay from the grille becomes difficult due to the abnormality of the grille shutter and the cooling water cannot be efficiently cooled in the radiator, the flow rate of the cooling water supplied from the branching portion to the bypass passage can be increased. Thus, compared to when the cooling water is supplied to the radiator, the resistance received by the cooling water is reduced and the flow rate of the cooling water supplied to the undercover cooling water passage is increased. As a result, cooling of the cooling water in the undercover cooling water passage is stimulated, and therefore overheating of the engine is reliably prevented.

The controller may acquire a traveling speed of the vehicle and, as the acquired traveling speed increases, control the flow rate adjuster to increase the flow rate of the cooling water supplied to the undercover cooling water passage. According to this configuration, when the vehicle is traveling at a relatively high speed, the flow rate of the cooling water supplied to the undercover cooling water passage increases. Thus, the heat exchange between the cooling water and the air flowing below the undercover, in the undercover cooling water passage, is stimulated and the cooling water is effectively cooled.

According to another aspect of the present disclosure, a method of cooling an engine of a vehicle is provided. The vehicle is mounted thereon with a cooling system having a cooling water passage through which cooling water is supplied to a water jacket formed in the engine, and having an undercover cooling water passage provided in an undercover forming a bottom surface of the vehicle and where the cooling water is cooled by exchanging heat with air below the undercover, a radiator provided in the cooling water passage and configured to cool the cooling water by exchanging heat with air flowing into an engine bay from a grille that is an opening portion formed at a front end of the vehicle, and a grille shutter provided to the grille and configured to change an effective opening area of the grille. The method includes determining an abnormality of the grille shutter, and increasing, upon determining that the grille shutter has the abnormality, a flow rate of the cooling water supplied to the undercover cooling water passage compared to when determined that the grille shutter has no abnormality.

DETAILED DESCRIPTION OF THE DISCLOSURE

Hereinafter, cooling systems 1 and 1A according to embodiments will be described with reference to the accompanying drawings.

First Embodiment

<Vehicle>

Figure 1:
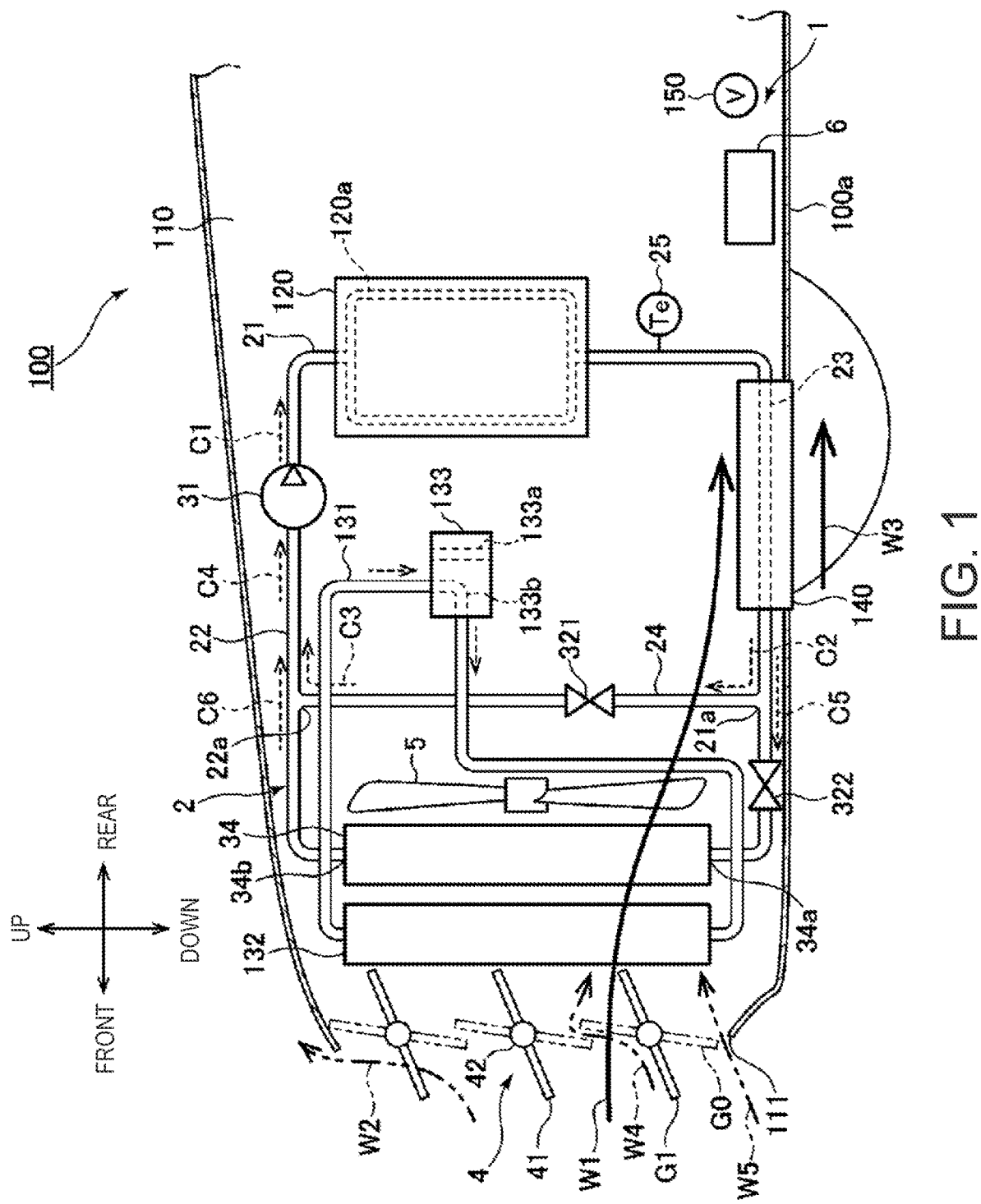
FIG. 1 is a schematic view of a vehicle on which a cooling system according to a first embodiment is mounted.

First, a vehicle 100 equipped with the cooling system 1 according to the first embodiment will be described with reference to FIG. 1. FIG. 1 is a schematic view of the vehicle 100 on which the cooling system 1 is mounted. An engine bay 110 accommodating an engine 120 is formed in a front part of the vehicle 100. An undercover 140 is disposed below the engine 120. The undercover 140 is made of a metal material having a high thermal conductivity (e.g., aluminum). The undercover 140 covers a lower part of the engine bay 110 and forms at least a part of a bottom surface 100a of the vehicle 100.

Here, a direction to which the vehicle 100 travels forward is referred to as "front" and a direction to which the vehicle 100 travels backward is referred to as "rear." Moreover, a vertically upward direction is referred to as "up" and a vertically downward direction is referred to as "down."

<Air Conditioner>

The vehicle 100 is mounted thereon with an air conditioner (not illustrated) which adjusts a temperature inside a cabin. The air conditioner operates using a circulating coolant. For example, the air conditioner has a compressor and an evaporator, and repeats compression, cooling, expansion, and evaporation of the coolant. Air flowing through an outer surface of the evaporator and cooled by exchanging heat with the coolant is supplied to the cabin of the vehicle 100 through a duct (not illustrated).

A cooling water passage 131, a radiator 132, and a condenser 133 are disposed in the engine bay 110 as elements for cooling the coolant used in the air conditioner. The condenser 133 is formed therein with passages 133a and 133b. The cooling water passage 131 allows cooling water to flow through the passage 133b of the condenser 133. When the cooling water passes through the passage 133b, it cools the coolant of the air conditioner flowing through the passage 133a, by exchanging heat therewith.

High-temperature cooling water passed through the passage 133b of the condenser 133 is supplied to the radiator 132 provided in the cooling water passage 131. The radiator 132 has a flat shape and is formed therein with a passage through which the cooling water flows. Further, the radiator 132 is disposed so that its thickness direction is in parallel to the front-and-rear direction.

As the vehicle 100 travels and a radiator fan 5 operates, air flows into the engine bay 110 from a grille 111 as indicated by an arrow W1 in FIG. 1. The air passes through the radiator 132 in its thickness direction. The cooling water flowing inside the radiator 132 is cooled by exchanging heat with this air. The cooling water that passed through the radiator 132 is supplied to the passage 133b of the condenser 133 by the cooling water passage 131 again, and is used for cooling the coolant. Here, the grille 111 is an opening portion formed at a front end of the vehicle 100 to allow air to flow into the engine bay 110.

<Cooling System Configuration>

The engine 120 is an internal combustion engine which generates a drive force of the vehicle 100. The cooling system 1 is mounted on the vehicle 100 to cool the engine 120. In detail, the cooling system 1 is mounted to cool the engine 120 by using the cooling water and maintain the temperature of the engine 120 at a suitable value.

Figure 2:
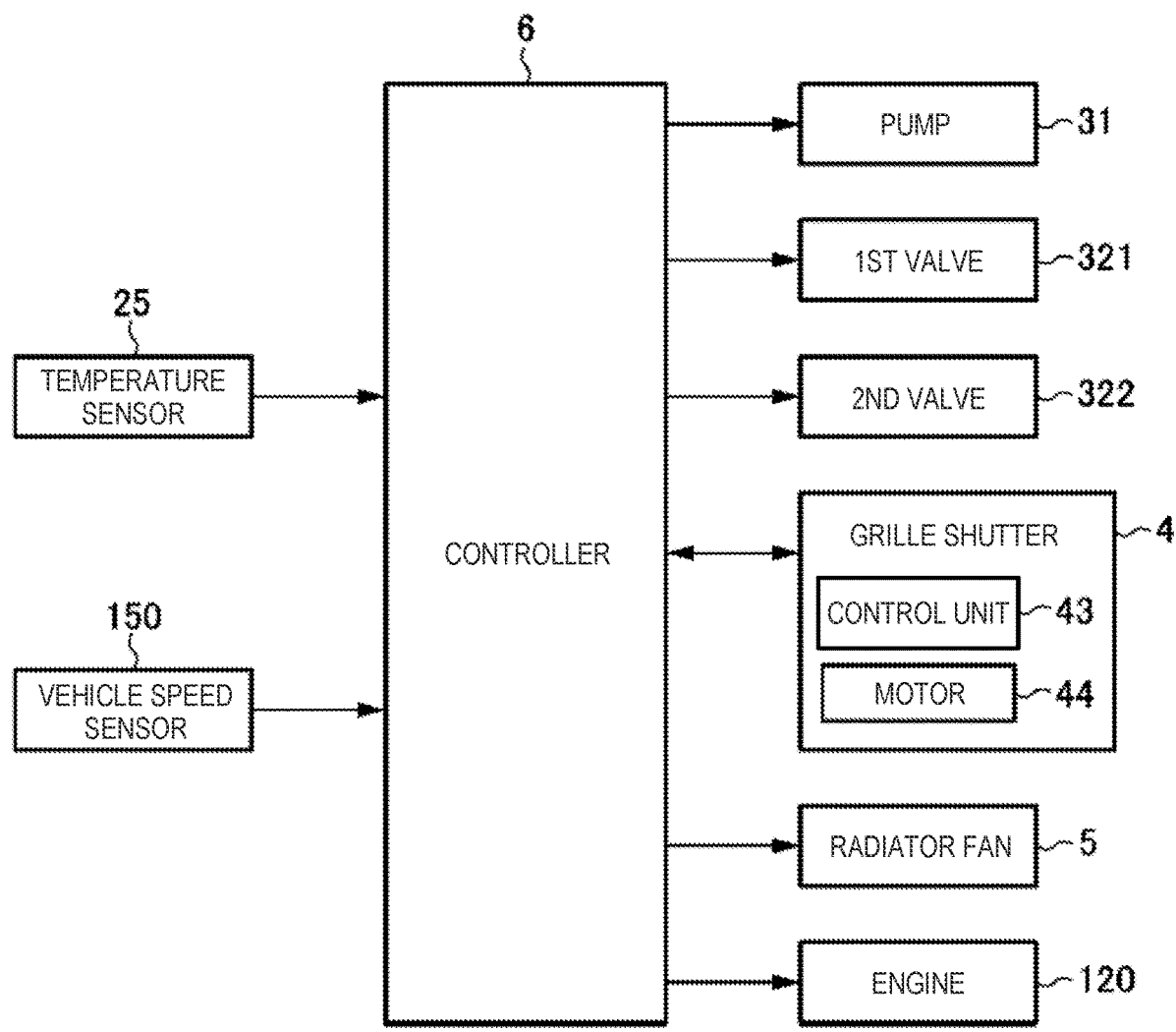
FIG. 2 is a block diagram illustrating a controller.

The configuration of the cooling system 1 is described with reference to FIGS. 1 and 2. FIG. 2 is a block diagram illustrating a controller 6. As illustrated in FIG. 1, the cooling system 1 includes a cooling water passage 2, a grille shutter 4, the radiator fan 5, and the controller 6. Further, the cooling system 1 includes a pump 31 provided in the cooling water passage 2, a first valve 321, a second valve 322, and a radiator 34.

The cooling water passage 2 circulates the cooling water. The cooling water passage 2 has a supply passage 21 and a return passage 22. The supply passage 21 supplies the cooling water discharged by the pump 31 so as to pass through a water jacket 120a inside the engine 120 and then to an inlet 34a of the radiator 34. The return passage 22 returns the cooling water flowing out from an outlet 34b of the radiator 34 to the pump 31.

Further, the cooling water passage 2 has an undercover cooling water passage 23 and a bypass passage 24. The undercover cooling water passage 23 is a portion of the supply passage 21 and is formed inside the undercover 140. The bypass passage 24 connects a branching portion 21a provided in the supply passage 21 at a position downstream of the undercover cooling water passage 23, to a merging portion 22a provided in the return passage 22. That is, the bypass passage 24 bypasses the radiator 34 and allows the cooling water to flow from the supply passage 21 to the return passage 22.

A temperature sensor 25 is disposed at a position downstream of the engine 120 and upstream of the undercover cooling water passage 23. The temperature sensor 25 detects a temperature Te of the cooling water. The temperature sensor 25 is disposed near the engine 120. Therefore, the temperature Te of the cooling water detected by the temperature sensor 25 is substantially the same as that of the cooling water of the water jacket 120a in the engine 120.

The pump 31, the first valve 321, and the second valve 322 are one example of a "flow rate adjuster" according to the present disclosure. Further, the first valve 321 and the second valve 322 are one example of a "valve" according to the present disclosure. The pump 31 operates based on a control signal, to pressurize the cooling water and to discharge it downstream. A discharge pressure of the pump 31 is adjustable by changing the control signal. Each of the first and second valves 321 and 322 is an electromagnetic valve which is open when receiving no control signal and closed when receiving the control signal. The first valve 321 is provided in the bypass passage 24, and the second valve 322 is provided in the supply passage 21 at a position downstream of the branching portion 21a.

The radiator 34 has a flat shape and is disposed rearward of the radiator 132 so that its thickness direction is in parallel to the front-and-rear direction. A passage is formed inside the radiator 34 and the cooling water flows into the passage from the inlet 34a as well as flows out from the outlet 34b.

The grille shutter 4 changes an effective opening area of the grille 111 by changing its opening, and has a plurality of shutter plates 41, shutter shafts 42 and a link mechanism (not illustrated). Each of the shutter plates 41 is supported by a corresponding shutter shaft 42 to be swingable between a fully closed position G0 and a fully open position G1. By changing the opening of the grille shutter 4 and changing the effective opening area of the grille 111, a flow rate of the air flowing into the engine bay 110 is changed. Further, as illustrated in FIG. 2, the grille shutter 4 has a control unit 43 and a motor 44.

The control unit 43 receives a request signal and sets a target position of the shutter plate 41 based on the request signal. Then, the control unit 43 generates a control signal based on the target position and transmits this control signal to the motor 44.

The motor 44 is a brushless motor. The motor 44 generates a torque based on the control signal received from the control unit 43 and swings one of the plurality of shutter plates 41 with respect to the shutter shaft 42.

The swing movement of the one shutter plate 41 is transmitted to the other shutter plates 41 via the link mechanism. As a result, all the shutter plates 41 are swung in the same direction between the fully closed position G0 and the fully open position G1 and stopped at any position between the fully closed position G0 and the fully open position G1. When the shutter plate 41 is located at the fully closed position G0, a gap between adjacent shutter plates 41 becomes the smallest size, and the effective opening area of the grille 111 becomes the smallest area. When the shutter plate 41 is located at the fully open position G1, the gap between the adjacent shutter plates 41 becomes the largest size, and the effective opening area of the grille 111 becomes the largest area.

When the shutter plates 41 are made stationary to keep the effective opening area of the grille 111, a fixed current is constantly supplied to the motor 44. When changing the effective opening area of the grille 111, a torque for swinging the shutter plates 41 is generated in the motor 44 by increasing the current value. The control unit 43 monitors the change in the current value.

For example, if a foreign substance is caught between the shutter plates 41 or the shutter plates 41 are stuck, which interrupts the shutter plate 41 from swinging, an excessive current is supplied to the motor 44. When an abnormality occurs in the grille shutter 4 in which the effective opening area of the grille 111 cannot be changed and the current value exceeds a given threshold, the control unit 43 transmits an abnormality detection signal to the controller 6.

The radiator fan 5 is disposed rearward of the radiator 34. When the radiator fan 5 operates based on the control signal, as indicated by the arrow W1 in FIG. 1, air is drawn thereinto via the grille 111 and flows into the engine bay 110.

The controller 6 is an electronic control unit including a processor, memory, etc. As illustrated in FIG. 2, the controller 6 receives detection signals from the temperature sensor 25, a vehicle speed sensor 150, and the control unit 43 of the grille shutter 4. The controller 6 performs given calculations based on the respective detection signals to acquire information such as the temperature Te of the cooling water at the position downstream of the engine 120 and upstream of the undercover cooling water passage 23, a traveling speed V of the vehicle 100, and whether the grille shutter 4 is in an abnormal state.

The controller 6 performs a given calculation based on the acquired information to generate the control signal and the request signal. The controller 6 controls the respective elements by transmitting the control signal and the request signal to the pump 31, the first valve 321, the second valve 322, the grille shutter 4, and the radiator fan 5.

<Operation of Cooling System>

The configuration of the cooling system 1 is described with reference to FIG. 1.

(1) Traveling Speed V>Threshold V1

A state where after the traveling speed V of the vehicle 100 becomes constant at a value above a given threshold V1 within a short period of time (e.g., one minute) from the start of the engine 120 is described first.

The pump 31 does not operate when the temperature Te of the cooling water at a position downstream of the engine 120 and upstream of the undercover cooling water passage 23 is below a given threshold Te1. As described above, the temperature Te of the cooling water detected by the temperature sensor 25 is substantially the same as that of the cooling water of the water jacket 120a in the engine 120. The controller 6 acquires the temperature Te of the cooling water based on the detection signal received from the temperature sensor 25, and monitors the change thereof. Further, since the controller 6 does not transmit the control signals to the first valve 321 and the second valve 322, the first valve 321 and the second valve 322 are open.

Upon the rise of the temperature Te of the cooling water above the threshold Te1, the pump 31 starts operating. Further, the second valve 322 shifts to a closed state while the first valve 321 remains in an open state. As a result, the cooling water is supplied from the branching portion 21a to the bypass passage 24, while the supply of the cooling water from the branching portion 21a to the radiator 34 is prohibited. That is, as illustrated by arrows C1, C2, C3, and C4 in FIG. 1, the cooling water discharged from the pump 31 circulates in a path bypassing the radiator 34.

Further, the shutter plates 41 of the grille shutter 4 are at the fully closed position G0. Thus, as illustrated by an arrow W2 in FIG. 1, the flow of air from the grille 111 to the engine bay 110 is blocked by the shutter plates 41. As a result, it becomes possible to reduce air resistance which the vehicle 100 receives while traveling.

The cooling water discharged from the pump 31 is first supplied to the engine 120 and flows through the water jacket 120a in the engine 120. The cooling water cools the engine 120 by exchanging heat therewith when passing through the water jacket 120a. That is, the cooling water absorbs heat by passing through the engine 120 and rises in temperature.

The cooling water passed through the engine 120 is then supplied to the undercover cooling water passage 23. When the cooling water flows through the undercover cooling water passage 23, it is cooled by exchanging heat with the air below the undercover 140. In detail, as indicated by an arrow W3, the cooling water flowing through the undercover cooling water passage 23 exchanges heat with the air flowing below the undercover 140, through the undercover 140. Here, the undercover 140 functions as a heat radiating plate which dissipates heat from the cooling water to the air.

As described above, the cooling system 1 supplies the cooling water increased in temperature after passing through the engine 120, to the undercover cooling water passage 23 without supplying it to the radiator 34, and cools the cooling water in the undercover cooling water passage 23. While the temperature of the cooling water is relatively low, the grille 111 is closed to reduce the air resistance, while the cooling water is sufficiently cooled by exchanging heat with the air flowing below the undercover 140. Thus, the rise in the temperature Te of the cooling water becomes slow.

When the temperature Te exceeds a given threshold Te2, the first valve 321 shifts to the closed state and the second valve 322 shifts to the open state. Here, the threshold Te2 is above the threshold Te1. Thus, the supply of the cooling water from the branching portion 21a to the bypass passage 24 is prohibited, while the supply of the cooling water from the branching portion 21a to the radiator 34 becomes possible. That is, as illustrated by the arrows C1, C5, C6, and C4 in FIG. 1, the cooling water discharged from the pump 31 circulates in a path passing through the radiator 34.

Further, the grille shutter 4 opens the grille 111. The effective opening area of the grille 111 at this time point is determined based on the temperature Te. For example, the effective opening area of the grille 111 becomes larger as the temperature Te increases.

By opening the grille 111, air flows from the grille 111 into the engine bay 110 as illustrated by the arrow W1 in FIG. 1. The air first passes through the radiator 132 in its thickness direction, and then passes through the radiator 34. The cooling water flowing inside the radiator 34 is cooled by exchanging heat with this air. The cooling water passed through the radiator 34 is supplied to the pump 31 again by the return passage 22 of the cooling water passage 2.

As indicated by the arrow W1 in FIG. 1, the air that passed through the radiator 132 and the radiator 34 is supplied to reach above the undercover 140. The cooling water flowing through the undercover cooling water passage 23 is cooled also by exchanging heat with the air reached above the undercover 140. That is, the cooling water flowing through the undercover cooling water passage 23 dissipates heat not only to the air flowing below the undercover 140 but also to the air flowing above the undercover 140.

As described above, the cooling system 1 operates to cool the cooling water passed through the engine 120 and of which temperature exceeds the threshold Te2, by the undercover cooling water passage 23 and the radiator 34.

(2) Threshold V1>Traveling Speed V>Threshold V2

Next, a state after the traveling speed V of the vehicle 100 becomes constant at a value below the threshold V1 and above a given threshold V2 within a short period of time (e.g., one minute) from the start of the engine 120 is described. In this case, operations of the pump 31, the first valve 321, and the second valve 322 accompanying the rise of the temperature Te of the cooling water passing the engine 120 and to be supplied to the undercover cooling water passage 23, are substantially the same as those in the case of (1), except for the operation of the grille shutter 4.

In detail, the grille shutter 4 opens the grille 111 when the temperature Te of the cooling water exceeds the threshold Te1. The effective opening area of the grille 111 here is determined based on the temperature Te of the cooling water. Thus, the cooling water flowing through the undercover cooling water passage 23 is cooled by exchanging heat with air that reached above the undercover 140 and air flowing below the undercover 140.

Further, when the temperature Te of the cooling water exceeds the threshold Te2, the grille shutter 4 further opens the grille 111. Here, the effective opening area of the grille 111 is also determined based on the temperature Te of the cooling water. Thus, the flow rate of the air flowed in from the grille 111 and reached above the undercover 140 is increased, and the cooling of the cooling water in the undercover cooling water passage 23 is stimulated.

(3) Threshold V1>Traveling Speed V>Threshold V2, and Abnormality in Grille Shutter 4

Figure 3:
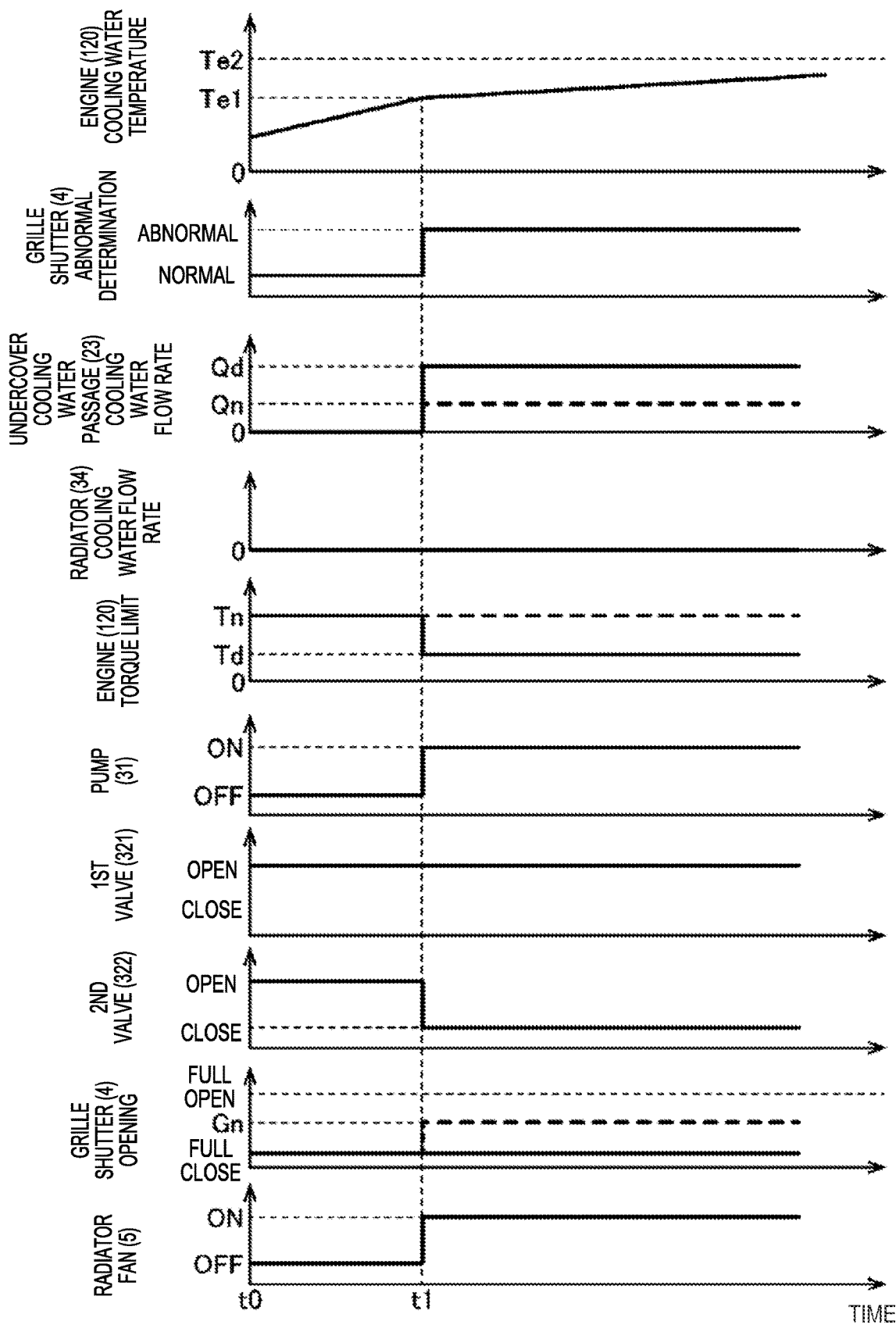
FIG. 3 is a time chart schematically illustrating an operation of the cooling system.

The cases (1) and (2) describe the operation of the cooling system 1 when the grille shutter 4 has no abnormality. Next, the case where the grille shutter 4 has an abnormality is described with reference to FIGS. 1 to 3, by using (2) as an example. FIG. 3 is a time chart schematically illustrating the operation of the cooling system 1.

From a time point t0 to a time point t1 illustrated in FIG. 3, the temperature Te of the cooling water at the position downstream of the engine 120 and upstream of the undercover cooling water passage 23 is below the threshold Te1. Here, the pump 31 does not operate as described above. Further, the first and second valves 321 and 322 are in the open state. Further, the shutter plate 41 of the grille shutter 4 is located at the fully closed position G0 and the grille 111 is closed.

At the time point t1, upon the rise of the temperature Te of the cooling water above the threshold Te1, the pump 31 starts operating, and the second valve 322 shifts to a closed state while the first valve 321 remains in the open state. Further, as illustrated by the dashed line, the controller 6 transmits a request signal to the grille shutter 4 in order to increase the opening of the grille shutter 4 to an opening Gn.

Here, FIG. 3 illustrates in a solid line a state where the grille shutter 4 has an abnormality, the shutter plate 41 cannot swing even when the control unit 43 of the grille shutter 4 receives the request signal, and the opening of the grille shutter 4 is not changed even after the time point t1. In this case, the controller 6 receives an abnormality detection signal from the control unit 43, and determines abnormality of the grille shutter 4.

When determined that the grille shutter 4 has an abnormality, the pump 31 operates such that the flow rate of the cooling water supplied to the undercover cooling water passage 23 becomes Qd. The flow rate Qd is above a rate Qn of the cooling water supplied to the undercover cooling water passage 23 when the grille shutter 4 is normal. The cooling water discharged from the pump 31 circulates in a path bypassing the radiator 34 (see the arrows C1, C2, C3, and C4 in FIG. 1) and is cooled in the undercover cooling water passage 23.

Further, a torque limit of the engine 120 (i.e., a highest allowable value of the torque outputted to the engine 120) is set to Td. The torque limit Td is below a torque limit Tn when the grille shutter 4 is normal. By limiting the torque limit in this manner, an amount of fuel supplied to the engine 120 is reduced, and a generation of combustion heat is reduced.

Furthermore, the radiator fan 5 operates. As described above, the grille shutter 4 has an abnormality, and the shutter plate 41 remains at the fully closed position G0. However, as illustrated by arrows W4 and W5 in FIG. 1, the radiator fan 5 forcibly draws in air via a minute gap between adjacent shutter plates 41 and 41 and a minute gap between the shutter plate 41 and the grille 111, and guides the air into the engine bay 110. Although the amount of this air is small, it reaches above the undercover 140 and contributes to the cooling of the cooling water in the undercover cooling water passage 23.

<Processing Executed by Controller>

Figure 4:
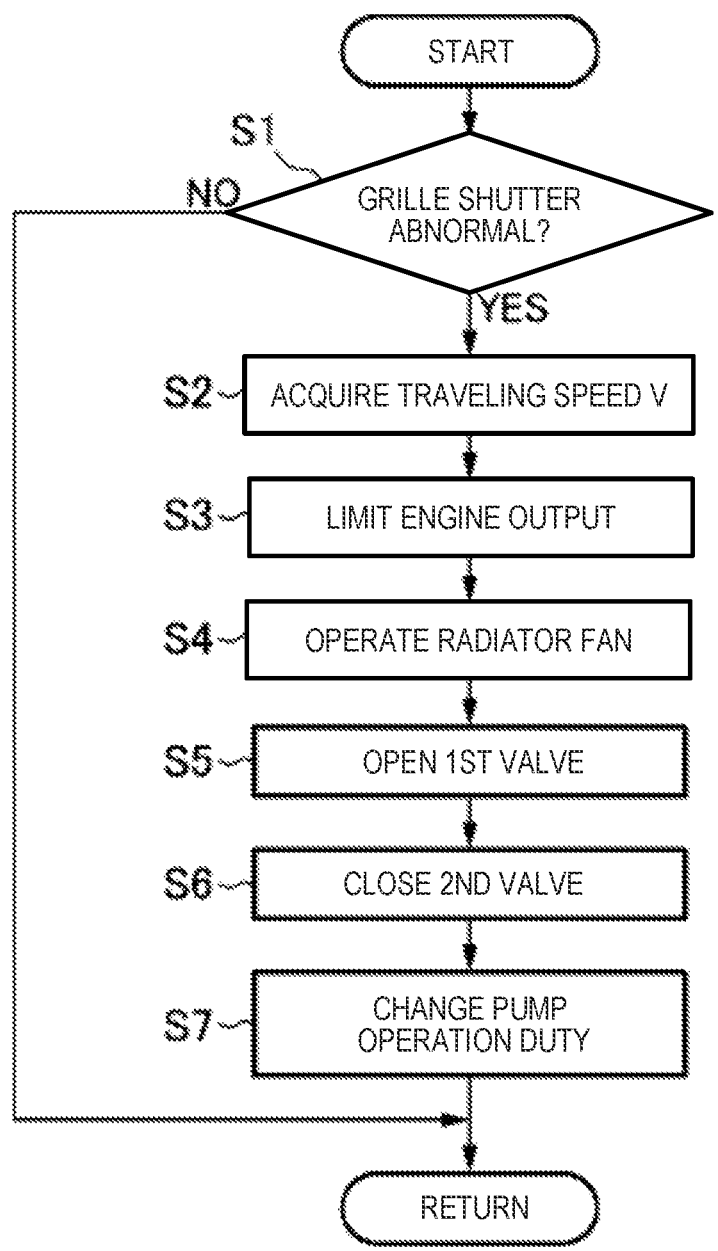
FIG. 4 is a flowchart illustrating processing executed by the controller.

Next, processing executed by the controller 6 is described with reference to FIG. 4. FIG. 4 is a flowchart illustrating the processing executed by the controller 6. The controller 6 executes the processing illustrated in FIG. 4 when changing the opening of the grille shutter 4.

First at Step S1 illustrated in FIG. 4. the controller 6 determines whether the grille shutter 4 has an abnormality. For example, the controller 6 determines whether an abnormality detection signal is received from the control unit 43 of the grille shutter 4. If the abnormal detection signal is not received and determined that the grille shutter 4 has no abnormality (Step S1: NO), the controller 6 does not execute the processing at Step S2 and subsequent flows. On the other hand, if determined that the grille shutter 4 has an abnormality (Step S1: YES), the controller 6 proceeds to Step S2. Note that here, the controller 6 may immediately inform a person on the vehicle 100 of the abnormality and prompt the person to avoid a danger caused therefrom. For example, the controller 6 may display "Please return to garage" on a display unit provided in the cabin to prompt the person to return the vehicle 100 to its parking space.

At Step S2, the controller 6 acquires the traveling speed V of the vehicle 100 based on the detection signal received from the vehicle speed sensor 150.

At Step S3, the controller 6 limits the output of the engine 120. That is, the controller 6 sets the torque limit of the engine 120 to be lower than that when the grille shutter 4 is normal as described above.

At Step S4, the controller 6 operates the radiator fan 5. Thus, air is guided into the engine bay 110 via the minute gap between adjacent shutter plates 41 and 41 and the minute gap between the shutter plate 41 and the grille 111.

At Step S5, the controller 6 opens the first valve 321 and closes the second valve 322 at Step S6. Further at Step S7, the controller 6 increases an operation duty of the pump 31 to be larger than when the grille shutter 4 is normal. Thus, the cooling water discharged from the pump 31 circulates in the path bypassing the radiator 34 (see the arrows C1, C2, C3, and C4 in FIG. 1) and is cooled in the undercover cooling water passage 23. Moreover, the flow rate of the cooling water supplied to the undercover cooling water passage 23 is higher than when the grille shutter 4 is normal.

Furthermore, the operation duty of the pump 31 here is changed based on the traveling speed V of the vehicle 100 acquired at Step S2. In detail, the operation duty is changed to increase the flow rate of the cooling water supplied to the undercover cooling passage 23 as the traveling speed V of the vehicle 100 increases.

<Effects>

According to the above configuration, when determined that the grille shutter 4 has an abnormality, the controller 6 controls the pump 31, the first valve 321, and the second valve 322 (which are the flow rate adjuster) to increase the flow rate of the cooling water supplied to the undercover cooling water passage 23 compared to when the grille shutter 4 is not abnormal. Thus, even when an airflow into the engine bay 110 from the grille 111 becomes difficult due to the abnormality of the grille shutter 4 and the cooling water cannot be efficiently cooled in the radiator 34, the cooling of the cooling water in the undercover cooling water passage 23 is stimulated. As a result, the overheat of the engine 120 in the abnormal state of the grille shutter 4 is prevented.

Further, the cooling water passage 2 has the bypass passage 24 connecting the branching portion 21a disposed upstream of the radiator 34 and downstream of the undercover cooling water passage 23, to the merging portion 22a disposed downstream of the radiator 34 and upstream of the engine 120. The flow rate adjuster has the first valve 321 and the second valve 322 (valve) which adjust the flow rate of the cooling water supplied to the branching portion 21a and the bypass passage 24. When determined that the grille shutter 4 has an abnormality, the controller 6 controls the first valve 321 and the second valve 322 (valve) to increase the flow rate of the cooling water supplied to the undercover cooling water passage 23 from the branching portion 21a compared to when determined that the grille shutter 4 has no abnormality.

According to this configuration, even when the airflow into the engine bay 110 from the grille 111 becomes difficult due to the abnormality of the grille shutter 4 and the cooling water cannot be efficiently cooled in the radiator 34, the flow rate of the cooling water supplied to the bypass passage 24 from the branching portion 21a is increased. Thus, compared to when the cooling water is supplied to the radiator 34, the resistance received by the cooling water is reduced and the flow rate of the cooling water supplied to the undercover cooling water passage 23 is increased. As a result, cooling of the cooling water in the undercover cooling water passage 23 is stimulated, and therefore the overheating of the engine 120 is reliably prevented.

Further the controller 6 acquires the traveling speed V of the vehicle 100 and, as the acquired traveling speed V is larger, controls the pump 31, the first valve 321, and the second valve 322 (which are the flow rate adjuster) to increase the flow rate of the cooling water supplied to the undercover cooling water passage 23.

According to this configuration, when the vehicle 100 is traveling at a relatively high speed, the flow rate of the cooling water supplied to the undercover cooling water passage 23 increases. Thus, the heat exchange between the cooling water and the air flowing below the undercover 140, in the undercover cooling water passage 23, is stimulated and the cooling water is effectively cooled.

Second Embodiment

Figure 5:
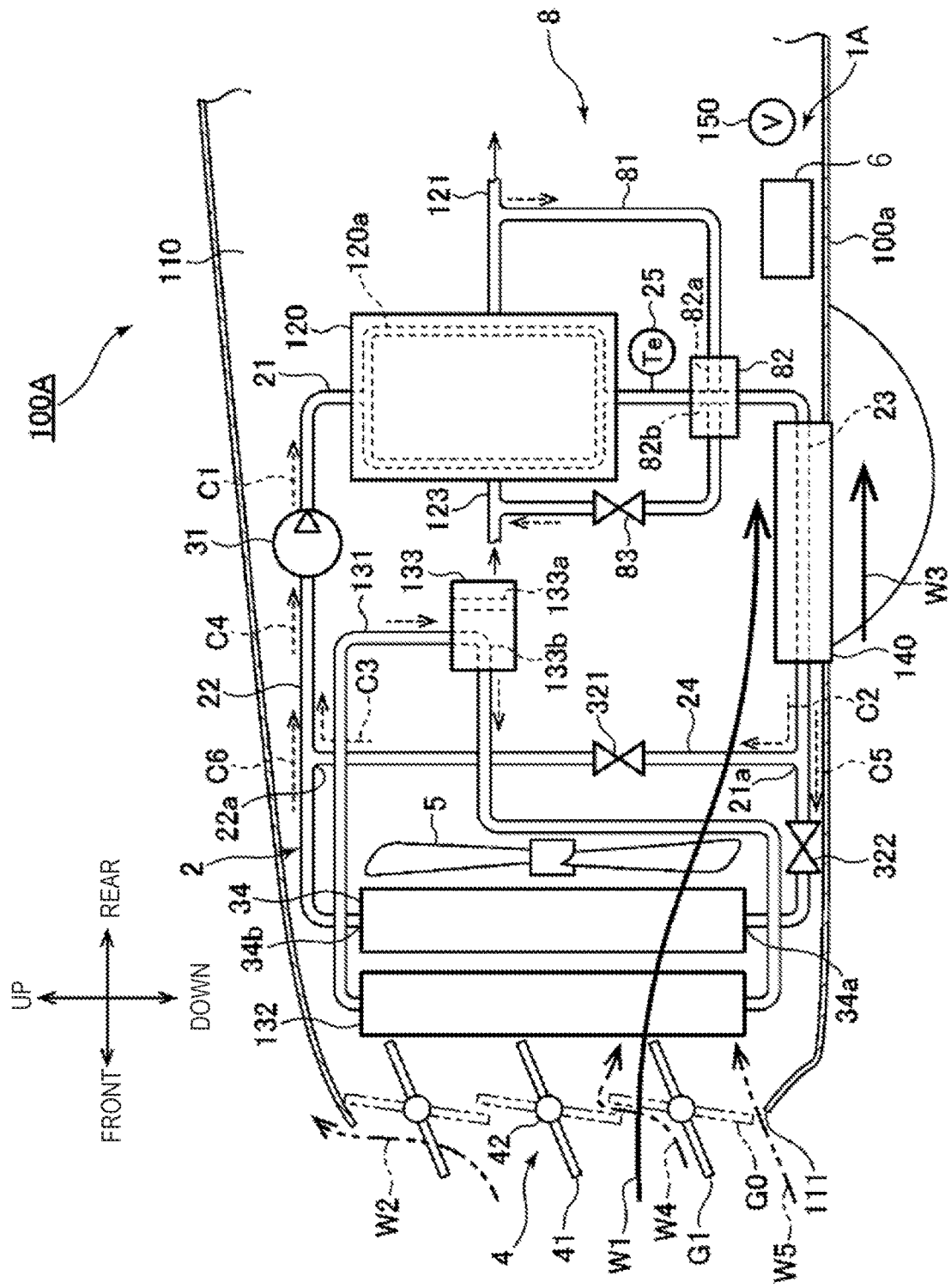
FIG. 5 is a schematic view of a vehicle on which a cooling system according to a second embodiment is mounted.

Next, the cooling system 1A according to the second embodiment is described with reference to FIG. 5. The cooling system 1A cools air used in an exhaust gas recirculation (EGR) system 8 mounted on a vehicle 100A in addition to the air used in the engine 120. Parts of a configuration of the cooling system 1A having the same components as those of the first embodiment are denoted with the same reference numerals, and the description thereof is suitably omitted. FIG. 5 is a schematic view of the vehicle 100A on which the cooling system 1A is mounted.

<EGR System>

The EGR system 8 is mounted on the vehicle 100A in order to prevent generation of nitrogen oxides in the engine 120 and knocking. The EGR system 8 includes an EGR gas passage 81, an EGR cooler 82, and an EGR valve 83.

The EGR gas passage 81 connects an exhaust duct 121 and an intake duct 123. High-temperature gas discharged from the engine 120 to the exhaust duct 121 partially flows through the EGR gas passage 81 and is guided to the intake duct 123.

The EGR cooler 82 and the EGR valve 83 are provided in the EGR gas passage 81. The EGR cooler 82 is formed therein with a passage 82a through which gas flows and a passage 82b through which cooling water flows. The gas flowing through the EGR gas passage 81, when flowing through the passage 82a, is cooled by exchanging heat with the cooling water flowing through the passage 82b after passing through the engine 120. The EGR valve 83 adjusts a flow rate of gas through the EGR gas passage 81 according to the state of the engine 120.

<Cooling System Configuration>

As described above, the cooling water used in the cooling system 1A is used not only for cooling the engine 120 but also for cooling the gas of the EGR system 8. The cooling water having a high temperature due to the heat exchange with the engine 120 and the gas are cooled by exchanging heat with air in the undercover cooling water passage 23 and the radiator 34.

<Effects>

According to the above configuration, the cooling water for cooling the engine 120 is also used to cool the gas of the EGR system 8. As a result, the configuration comprised of the cooling system 1A and the EGR system 8 are made compact.

The above embodiments are for facilitating the understanding of the present disclosure, and are not for limiting the interpretation of the present disclosure. Each element included in each embodiment, its arrangement, material, condition, shape, size, etc. are not limited to those illustratively described, and are suitably changeable.

In the above embodiments, the undercover cooling water passage 23 is formed inside the undercover 140. However, the present disclosure is not limited to this mode. For example, a pipe may be arranged to be in contact with an upper surface of the undercover 140 and a passage in the pipe may be used as the undercover cooling water passage. That is, the undercover cooling water passage may adopt any of various modes as long as its heat is exchangeable with air through the undercover 140.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1, 1A Cooling System
2 Cooling Water Passage
21a Branching Portion
22a Merging Portion
23 Undercover Cooling Water Passage
24 Bypass Passage
31 Pump (Flow Rate Adjuster)
321 First Valve (Flow Rate Adjuster, Valve)
322 Second Valve (Flow Rate Adjuster, Valve)
34 Radiator
4 Grille Shutter
6 Controller
100, 100A Vehicle
100a Bottom Surface
110 Engine Bay
111 Grille
120 Engine
120a Water Jacket
140 Undercover

What is claimed is:

1. A cooling system configured to cool an engine of a vehicle, the cooling system comprising:
   a cooling water passage through which cooling water is supplied to a water jacket formed in the engine, and having an undercover cooling water passage provided in an undercover forming a bottom surface of the vehicle and where the cooling water is cooled by exchanging heat with air flowing below the vehicle;
   a radiator provided in the cooling water passage and configured to cool the cooling water by exchanging heat with air flowing into an engine bay from a grille that is an opening portion formed at a front end of the vehicle;
   a flow rate adjuster including a pump or valve, configured to adjust a flow rate of the cooling water supplied to the undercover cooling water passage;
   a grille shutter provided to the grille and configured to change an effective opening area of the grille; and
   a controller configured to determine an abnormality of the grille shutter and control the flow rate adjuster, the controller controlling, upon determining that the grille shutter has the abnormality, the flow rate adjuster to increase the flow rate of the cooling water supplied to the undercover cooling water passage compared to when determined that the grille shutter has no abnormality.

2. The cooling system of claim 1,
   wherein the cooling water passage has a bypass passage connecting a branching portion disposed at a position upstream of the radiator and downstream of the undercover cooling water passage, to a merging portion disposed at a position downstream of the radiator and upstream of the engine,
   wherein the flow rate adjuster includes the valve which is configured to adjust a flow rate of the cooling water supplied from the branching portion to the bypass passage, and
   wherein the controller controls, upon determining that the grille shutter has the abnormality, the valve to increase the flow rate of the cooling water supplied to the bypass passage from the branching portion compared to when determined that the grille shutter has no abnormality.

3. The cooling system of claim 2, wherein the controller acquires a traveling speed of the vehicle and, as the acquired traveling speed increases, controls the flow rate adjuster to increase the flow rate of the cooling water supplied to the undercover cooling water passage.

4. The cooling system of claim 1, wherein the controller acquires a traveling speed of the vehicle and, as the acquired traveling speed increases, controls the flow rate adjuster to increase the flow rate of the cooling water supplied to the undercover cooling water passage.

5. The cooling system of claim 1, wherein
   the cooling water is cooled by exchanging heat with air flowing above and below the undercover.

6. A method of cooling an engine of a vehicle, the vehicle is mounted thereon with a cooling system having a cooling water passage through which cooling water is supplied to a water jacket formed in the engine, and having an undercover cooling water passage provided in an undercover forming a bottom surface of the vehicle and where the cooling water is cooled by exchanging heat with air flowing below the vehicle, a radiator provided in the cooling water passage and configured to cool the cooling water by exchanging heat with air flowing into an engine bay from a grille that is an opening portion formed at a front end of the vehicle, and a grille shutter provided to the grille and configured to change an effective opening area of the grille, the method comprising:
   determining an abnormality of the grille shutter; and
   increasing, upon determining that the grille shutter has the abnormality, a flow rate of the cooling water supplied to the undercover cooling water passage compared to when determined that the grille shutter has no abnormality.

* * * * *